United States Patent
Mannonen et al.

(10) Patent No.: US 9,278,358 B2
(45) Date of Patent: Mar. 8, 2016

(54) METHOD FOR REFINING COAL ASH BY SEPARATING CARBONOUS PRODUCT AND REGENERATING SILICEOUS ASH PRODUCTS AND USE OF A CARBONOUS PRODUCT PRODUCED BY THE METHOD

(75) Inventors: Risto Mannonen, Espoo (FI); Jouko Niemi, Pirkkala (FI)

(73) Assignee: MICROPULVA LTD OY (FI)

( * ) Notice: Subject to any disclaimer, the term of this patent is extended or adjusted under 35 U.S.C. 154(b) by 267 days.

(21) Appl. No.: 13/057,770

(22) PCT Filed: Aug. 7, 2009

(86) PCT No.: PCT/FI2009/000074
§ 371 (c)(1),
(2), (4) Date: Feb. 7, 2011

(87) PCT Pub. No.: WO2010/034872
PCT Pub. Date: Apr. 1, 2010

(65) Prior Publication Data
US 2011/0138686 A1    Jun. 16, 2011

(30) Foreign Application Priority Data
Aug. 7, 2008    (FI) ..................... 20080453

(51) Int. Cl.
*C10L 5/00*    (2006.01)
*B03B 9/04*    (2006.01)
*C10L 5/04*    (2006.01)
(Continued)

(52) U.S. Cl.
CPC ... *B03B 9/04* (2013.01); *B03D 1/02* (2013.01); *C04B 18/065* (2013.01); *C04B 20/02* (2013.01); *C10L 5/04* (2013.01); *C10L 9/00* (2013.01);
(Continued)

(58) Field of Classification Search
CPC ............... B03B 9/04; C10L 5/04; C10L 9/02; C10L 9/00; C04B 18/065; C04B 20/02; B03D 1/02; B03D 1/247; B03D 2203/08; Y02W 30/92
USPC ............................................. 44/620
See application file for complete search history.

(56) References Cited

U.S. PATENT DOCUMENTS 8,696,770 B2 *    4/2014    Jeong ............................. 44/620

FOREIGN PATENT DOCUMENTS

| DE | 3628963 | 3/1988 |
|----|---------|--------|
| EP | 2103361 | 9/2009 |
| GB | 2129714 | 5/1984 |

*Primary Examiner* — Cephia D Toomer
(74) *Attorney, Agent, or Firm* — Galbreath Law Offices, P.C.; John A. Galbreath

(57) ABSTRACT

Method for industrial processing of charcoal ash (1) created in the power plants by separating a carbonaceous product from the mentioned charcoal ash to be reused and by gathering essentially carbon free, siliceous ash products gained during the processing. Li the method charcoal ash (1) is directed to the foaming process (11, 6a) in which process ash contents containing silicate and coal are separated by using water as an intermediate agent in which case the separation is based on the surface-active properties of the coal regarding an easy foaming; further the coal concentrate created during the foaming and the harsh ash fraction nearly freed from the coal and fine components are filtered in filters (7a), (7b) and at least a harsh ash fraction containing silicate and being nearly carbon free is transferred in order to evaporate the water left over during the filtering by using hot, low pressure work gas through a pneumatic classification device as dried to product silos (12) and (13) and the concentrated coal is returned to produce energy.

6 Claims, 3 Drawing Sheets

(51) Int. Cl.
*C10L 9/02* (2006.01)
*C10L 9/00* (2006.01)
*C04B 18/06* (2006.01)
*C04B 20/02* (2006.01)
*B03D 1/02* (2006.01)
*B03D 1/24* (2006.01)

(52) U.S. Cl.
CPC . *C10L 9/02* (2013.01); *B03D 1/247* (2013.01); *B03D 2203/08* (2013.01); *Y02W 30/92* (2015.05)

METHOD FOR REFINING COAL ASH BY SEPARATING CARBONOUS PRODUCT AND REGENERATING SILICEOUS ASH PRODUCTS AND USE OF A CARBONOUS PRODUCT PRODUCED BY THE METHOD

This application is a 371 of PCT/FI09/00074 filed Aug. 7, 2009.

Invention relates to a method for processing industrially charcoal ash that is generated in power plants by separating a carbonaceous product from the mentioned charcoal ash and by returning it to be used again and by gathering essentially carbon free, siliceous ash products that are gained during the processing. Further the invention relates to the use of a carbonaceous fine product produced with the help of the above mentioned method.

The charcoal ash that is generated in power plants includes incombustible coal various amounts from the value 1% to even 20%. The ash contents of the charcoal ash are mainly formed of round particles that are glazed silicate minerals. The particle form is advantageous and makes it possible that charcoal ash can be utilized in many applications as long as its carbon content is low enough and stable.

It is a known fact that the charcoal ash can be used as such in concrete products and in other dry products related to building and in concrete work applications.

The great variation in the amount of the incombustible carbon being in ash hinders the more extensive utilizing of the charcoal ash. High carbon content decreases the workability of fresh concrete, makes it difficult to use certain added ingredients and dyes the concrete. The use of charcoal ash is defined in the specifications in which its use is controlled according to the carbon content of the charcoal ash. In addition to that the granule distribution of charcoal ash is very wide, 0.1 μm-1000 μm.

Experiments have shown that even 50 p-% fine fraction with the granule size that is under 50 μm can be economically removed from the charcoal ash by classifying pneumatically. Depending on the burning process incombustible coal is enriched to various products and fractions. In certain cases the carbon content of a fine product or a fraction is significantly higher than an average carbon content. By returning this kind of product or a fraction back to the boiler plant of the power plant the incombustible coal can be burned and utilize the energy of coal during the burning process.

Ash that is generated during the burning of the crumbled charcoal is formed during the process in which the minerals included in the charcoal become destroyed, melt and harden when the combustion gases are cooling before the purification of combustion gases occurring in the electric filters. Both the fact that the minerals disintegrate into oxides and that the generating crystal agents melt require a lot of energy. Because of this all flying ash that is generated during the normal burning process of charcoal has no time to melt completely before it cools down. Melting of siliceous material and fast cooling is essential in order to achieve pozzolanic activity.

Flying ash that has been returned to the process through classification or foaming process has disintegrated into oxides already during the first burning process and for its part for once melted and thus lost its crystal form. Thermal energy being in a boiler plant in order to disintegrate or melt the returned ash is no longer needed for these processes. The ash becomes warm quickly, the coal included in the ash burns and the ash melts quickly. The temperature of a recycled ash before the separation occurring in the electric filters is significantly higher than the temperature of the inorganic material coming to the first burning and coming with the crumbled charcoal. This results in the fact that also the glazing grade of the cooled ash is significantly higher in the recycled ash.

The significantly higher temperature of recycled ash causes the diminishing of the viscosity and surface tension of the melted ash and thus results in a smaller particle size. Smaller particle size again results in a better pozzolanic activity and thus also to higher activity when it is being used in concrete based products.

If the carbon content of ash is high and the incombustible coal is very fine, the fine product can be combined to the coal concentrate that is generated during the process and thus it can be utilized as energy. Analogously if the carbon content of ash is <5 w-%, this part of the ash can be applied excellently to be used in various dry products used in the construction engineering.

With the help of pneumatic classification based on the particle size the desired amount of fine fraction can be reduced of the charcoal ash in which case a foaming method based on the usage of water is possible to make function selectively and the coal can be separated from the actual silicate based ash carefully and economically.

Water is removed from the carbon free and carbonaceous fraction with the help of a filtering technique and carbon free fraction is dried immediately after the filtering stage.

Drying is performed when hot work gas is used when the material is being transferred from a filtering stage to a classifier that functions pneumatically which classifier classifies harsh and fine fraction to be separate.

The generated carbon free product fractions can be utilized:
  as such for example in a self-sealing concrete mass
  in order to adjust the carbon content of the fine fractions that were generated at the first stage of the process
  by micronizing carbon free fraction to be very fine in which case its activity index rises higher than the activity index of cement and is suitable for replacing various silica products needed in concrete products.

It is characteristic of the method according to the invention for processing charcoal ash what is shown in the claims 1 and 2 and it is characteristic of the usage of the fine product produced by the method according to the invention what is shown in the claim 6.

The advantage of the invention is the fact that the charcoal ash can be advantageously separated from the coal to be free raw material and also the separated coal can be reused for example as fuel.

In the following the invention is described more detailed by referring to the accompanying drawings in which FIG. 1 shows diagrammatically a refinement process of charcoal ash.

Figure 1:
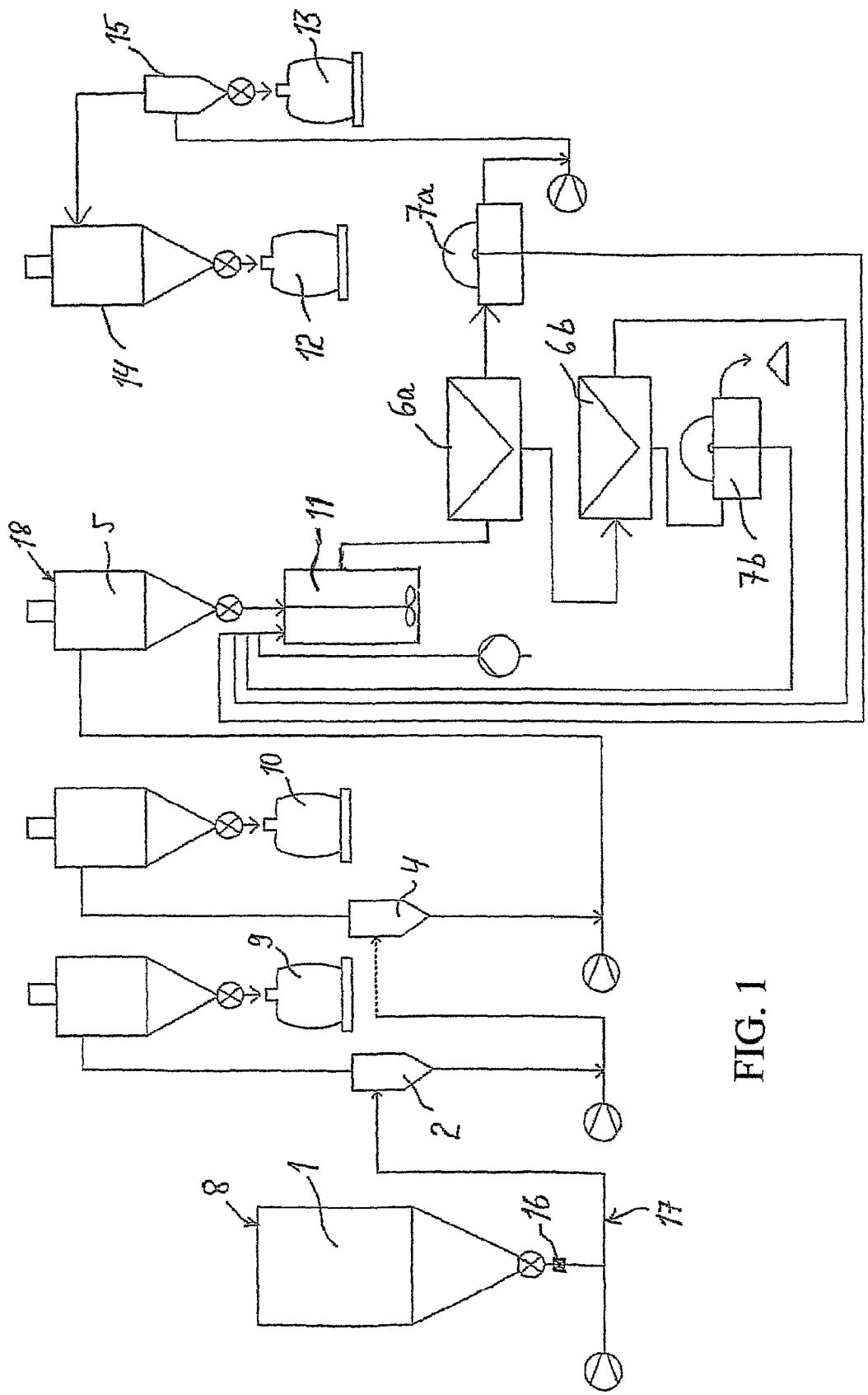

In the FIG. 1 there is a feeding container 8 of charcoal ash 1 from which feeding container charcoal ash is dosed to the process, such as to a pneumatic conveyance pipe system 17 which conveyance pipe system takes the mentioned ash to pneumatic classifiers 2 . . . 4 from which the coarsest fraction proceeds to a silo 18. The finest fractions are gathered to containers 9 and 10.

Coarse fraction 5 is dosed from the silo 18 to a to a preparation device 11 of the foaming device from which preparation device the foamed material is directed to foaming cells 6a, 6b and from them further ash fraction is directed through a filter 7a to be dried and through the classifiers 14, 15 is directed to the product silos 12 and 13. The coal is directed through the filter 7b to be reused.

There is advantageously the measuring of the carbon content of the charcoal ash 1 at the feeding container 8 with a device 16 with the help of which device material stream is directed from the classification devices 2 . . . 4 to the foaming on account of the on-line analyzing or a continuous analyzing and if needed—the returning of nearly carbon free fraction gained during the foaming is directed to the first classification steps 2 . . . 4 in order to reduce the carbon content. During the foaming chemicals added to the water are used to boost the foaming.

It is advantageous for the end product that nearly free, siliceous ash products gained from the product silos 12 and 13 are micronized or they will be micronized by using various fine grinding methods, such as counter shower grinding and a recycling method, so fine that its activity index becomes higher than the activity index of cement.

Figure 2:
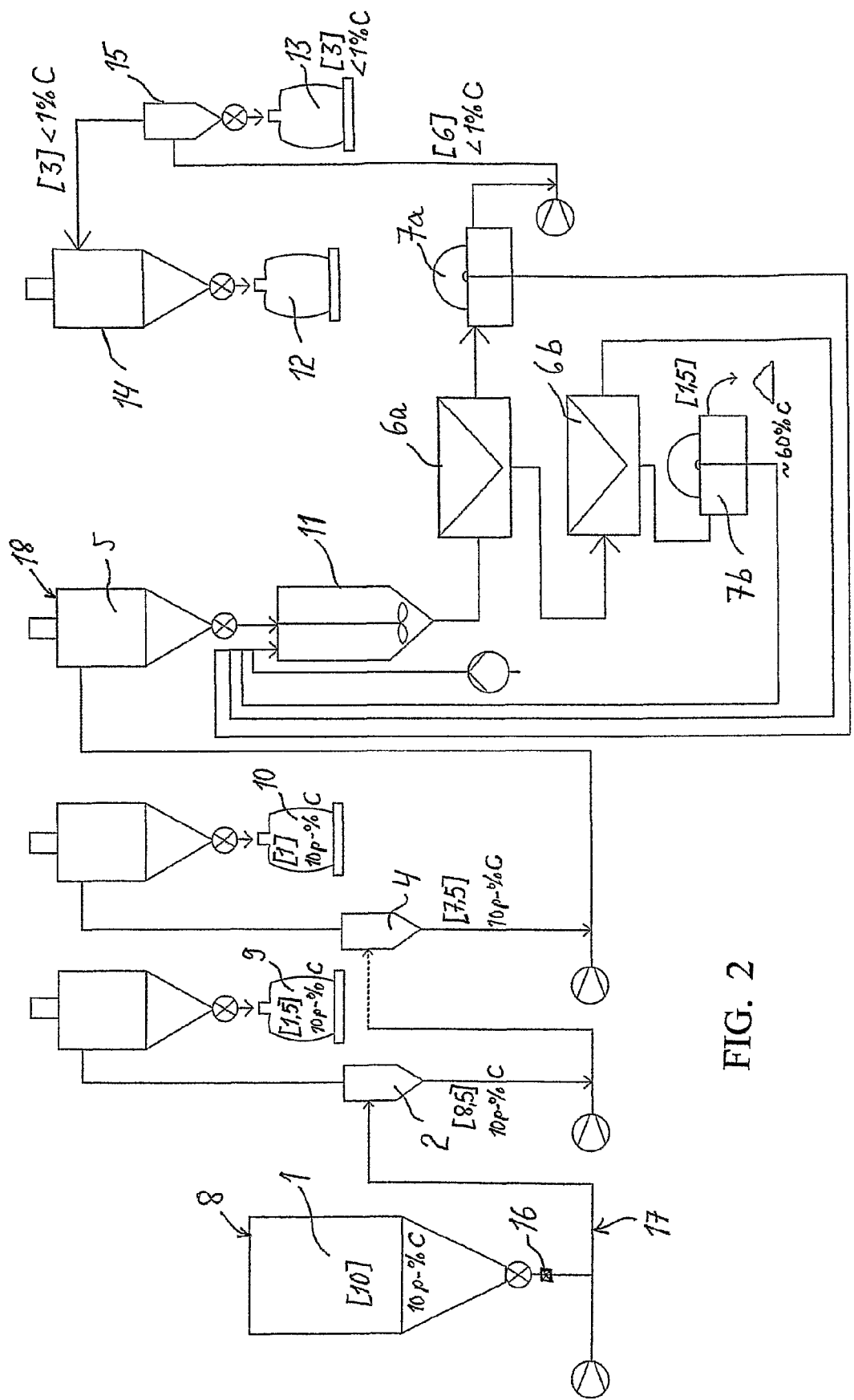
FIG. 2 shows diagrammatically distribution of a charcoal ash amount during the process at its various stages as w-%.

In the FIG. 2 there is a charcoal ash amount that has a size of 10 units in relation to its unit amount at the beginning stage in the container 1. The carbon content of the amount is the conventional 10 percentage by weight. Unit amounts at each stage of the process are shown as numbers within brackets.

The charcoal ash amount coming from the container 1 is classified in the classifiers 2 . . . 4 and in the example the unit amount 10 is distributed in such a way that 7.5 units coarser fraction continues its way to the container 18 and the finer fraction is gathered 1.5+1=2.5 units to the containers 9 and 10.

The 7.5 units directed to the container 18 is distributed with the help of the foaming device 11 in such a way that the gained coal, having the amount of 1.5 units, approximately 60 weight-% coal is directed to be reused and finer fraction, having the amount of 6 units that has less than 1% coal, is directed through classifiers 14, 15 to product silos 12 and 13, in the example 3 units for both silos in which case carbon content in them is under 1%.

According to one performance example fine, classified fraction is directed from the container 12 the C-content of which is under 1 w-% for example to the containers 9 and 10 with the fractions in them to be mixed in which case after the mixing their common unit amount is 2.5+3=5.5 and the carbon content is under 5 w-%.

If the fine product with high carbon content can be separated from the classifiers 2 and 4 to the containers 9 and 10, in one embodiment this fine product can be combined with the coal concentrate gained from the filter 7b and use the mixture of these in the energy production by burning this.

The quality of the ash to be processed depends on the charcoal and the construction of the combustion boiler. If the ash contains a lot of fine coal, it can be processed in the pneumatic classifier in which case the embodiment of the invention is according to the claim 2. If the fine substance of the ash does not include significantly coal that hinders the foaming, such as the size class <10 μm, the ash can be directed directly to the foaming process in which case the embodiment of the invention is according to the claim 1.

Figure 3:
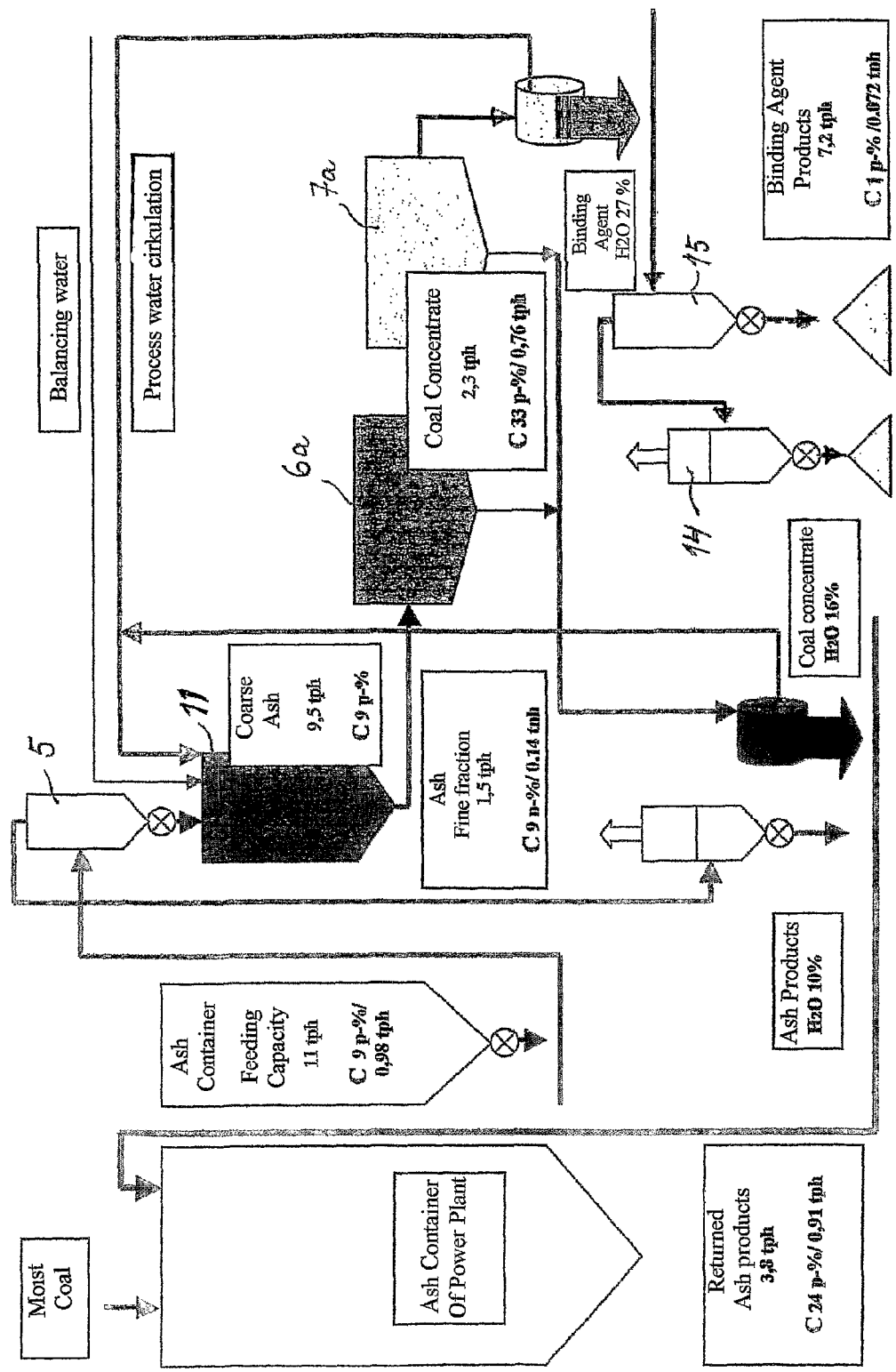
FIG. 3 shows mass distributions and contents achieved with tests.

In the FIG. 3 separating of coal meant for producing energy is shown. The coal becomes separated almost fully from the charcoal ash and further the figure shows that water, which is used as an intermediate agent in the purification, functions in a closed cycle to which addition is needed only for the amount that equals to the dampness that fades away with the product.

The invention claimed is:

1. Method for processing charcoal ash that is generated in power plants by separating in a foaming and filtering process a carbonaceous product from the mentioned charcoal ash to be used again and by gathering essentially carbon free, silicated ash products gained during the processing into product silos, characterized in that in the method charcoal ash (1) is directed to the foaming process (11, 6a) in which ash contents containing silicate product and coal product are separated from each other using water as an intermediate agent in which case the separating is based on the surface-active properties of the coal having effect on foaming, a coal product concentrate created during said foaming process and a coarse ash fraction that became nearly carbon-free, are filtered in the filters (7a), (7b) and at least said coarse ash fraction, which contains silicate and is nearly carbon free is dried in order to evaporate water that is left over by using heated, pressurized work gas, is directed through a pneumatic classifier and is then directed to the product silos (12) and (13) and the concentrated coal is returned as a fuel to energy production.

2. Method according to the claim 1, characterized in that the processability of the charcoal ash (1) is further improved by classifying the charcoal ash in the pneumatic classifiers (2 and 4) that function in series in such a way that the charcoal ash is in said classifiers classified to a fine and coarse fraction according to their particle sizes.

3. Method according to the claim 2, characterized in that of its particle size fine fraction in the silo (12) classified pneumatically from the ash produced in the foaming process and being nearly carbon free is directed to the fine fractions located in silos (9) and (10) created in the pneumatic classifiers (2 and 4) in order to reduce their carbon content.

4. Method according to the claim 2, characterized in that the processability of charcoal ash is further improved when the carbon content of the charcoal ash is monitored with continuous analyzing or with the help of an on-line analyzer which analyzing controls a need for pneumatic classification steps and the foaming of the coal fraction based on its carbon content.

5. Method according to the claim 1, characterized in that nearly carbon free, ash products containing silicate are micronized by using fine grinding methods, shower grinding, counter shower grinding and a recycling method so fine that the surface-activity properties of the products become higher than what non-micronized, silicate containing ash products have.

6. Method according to the claim 1, characterized in that during the foaming process foaming chemicals are added to the water to increase the foaming effectiveness.

* * * * *